US012630133B2

(12) United States Patent
Ando

(10) Patent No.: US 12,630,133 B2
(45) Date of Patent: May 19, 2026

(54) VEHICLE DRIVING SUPPORT DEVICE

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/818,854

(22) Filed: Aug. 29, 2024

(65) Prior Publication Data

US 2025/0083654 A1      Mar. 13, 2025

(30) Foreign Application Priority Data

Sep. 7, 2023    (JP) ................................. 2023-145169

(51) Int. Cl.
*B60T 8/58* (2006.01)
*B60T 7/22* (2006.01)
*B60T 8/171* (2006.01)
*B60T 8/172* (2006.01)

(52) U.S. Cl.
CPC ..... *B60T 8/58* (2013.01); *B60T 7/22* (2013.01); *B60T 8/171* (2013.01); *B60T 8/172* (2013.01); *B60T 2201/022* (2013.01); *B60T 2210/32* (2013.01); *B60T 2250/04* (2013.01)

(58) Field of Classification Search
CPC ... B60T 8/58; B60T 7/22; B60T 8/171; B60T 8/172; B60T 2201/022; B60T 2210/32; B60T 2250/04

USPC .......................................................... 701/70
See application file for complete search history.

(56) References Cited

U.S. PATENT DOCUMENTS

| 2022/0161792 A1* | 5/2022 | Murata | ............. B60W 30/0956 |
| 2023/0192042 A1* | 6/2023 | Schmalbruch | ............ B60T 1/10 |
| | | | 188/156 |
| 2023/0286478 A1* | 9/2023 | Inami | ........................ B60T 7/22 |

FOREIGN PATENT DOCUMENTS

JP           2021-191660 A      12/2021

* cited by examiner

*Primary Examiner* — Yi-Kai Wang
(74) *Attorney, Agent, or Firm* — Rimon P.C.

(57)              ABSTRACT

A vehicle driving support device includes a surrounding environment recognition unit, a travel control unit, and a collision avoidance controller. The collision avoidance controller is configured to estimate a position of a vehicle and generate a forecast traveling path thereof when turning across an opposite lane at an intersection, recognize an oncoming vehicle traveling on each of lanes of the opposite lane, based on surrounding environment information acquired by the surrounding environment recognition unit, detect, for each lane, a collision forecast position at which the forecast traveling path intersects with a traveling path of the oncoming vehicle, and forecast a collision of the vehicle with the oncoming vehicle, determine whether to execute collision avoidance control in which the travel control unit operates a brake driver, for the collision forecast position, and dispose the collision avoidance control such that kinetic energy remains in the vehicle in a traveling direction.

9 Claims, 10 Drawing Sheets

FIG. 3

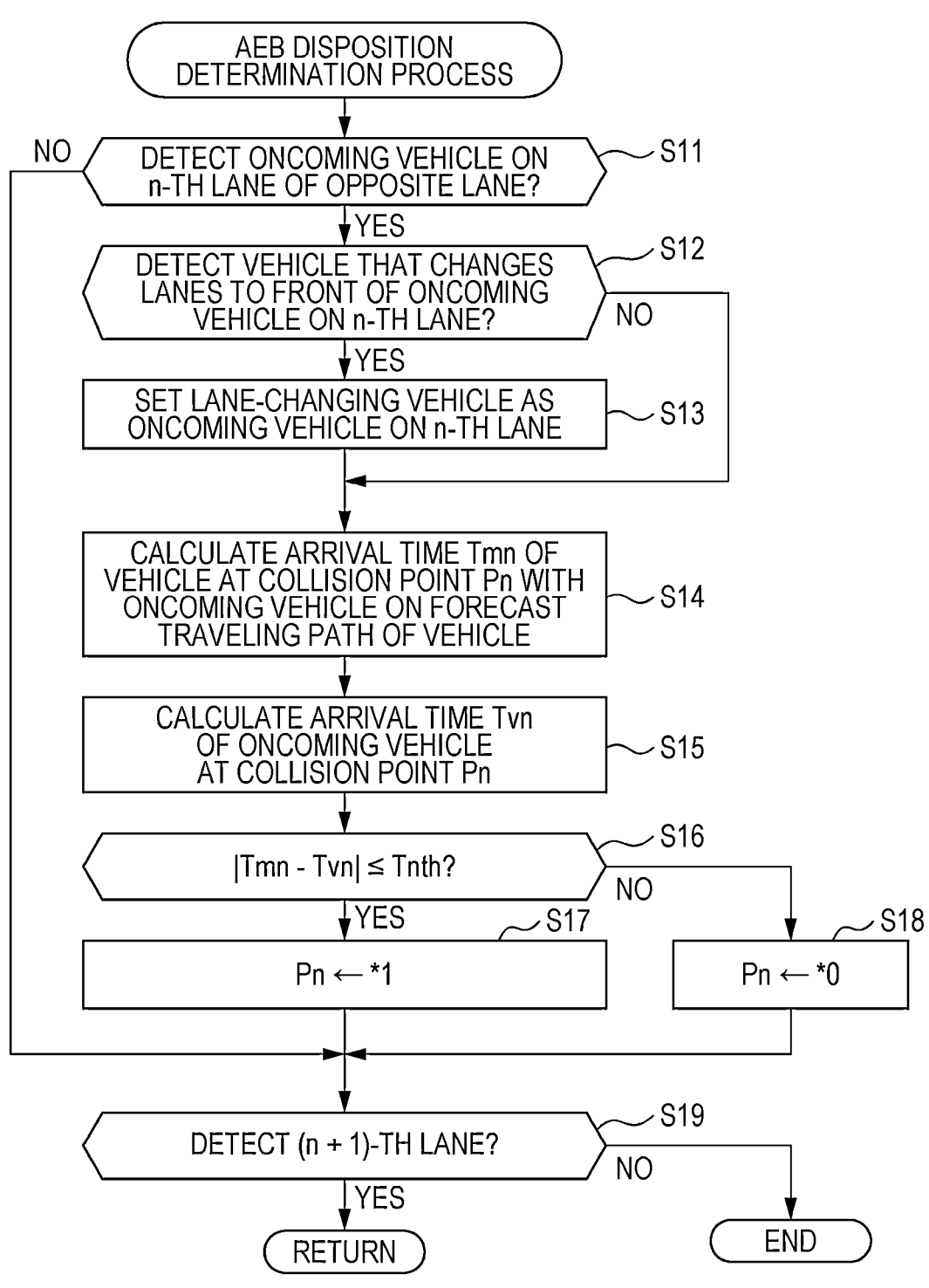

AEB DISPOSITION
DETERMINATION PROCESS

DETECT ONCOMING VEHICLE ON
n-TH LANE OF OPPOSITE LANE? — S11
NO

YES

DETECT VEHICLE THAT CHANGES
LANES TO FRONT OF ONCOMING
VEHICLE ON n-TH LANE? — S12
NO

YES

SET LANE-CHANGING VEHICLE AS
ONCOMING VEHICLE ON n-TH LANE — S13

CALCULATE ARRIVAL TIME Tmn OF
VEHICLE AT COLLISION POINT Pn WITH
ONCOMING VEHICLE ON FORECAST
TRAVELING PATH OF VEHICLE — S14

CALCULATE ARRIVAL TIME Tvn
OF ONCOMING VEHICLE
AT COLLISION POINT Pn — S15

$|Tmn - Tvn| \leq Tnth$? — S16
NO

YES — S17

$Pn \leftarrow *1$ $Pn \leftarrow *0$ — S18

DETECT (n + 1)-TH LANE? — S19
NO

YES

RETURN

END

1

VEHICLE DRIVING SUPPORT DEVICE

CROSS-REFERENCE TO RELATED APPLICATIONS

The present application claims priority from Japanese Patent Application No. 2023-145169 filed on Sep. 7, 2023, the entire contents of which are hereby incorporated by reference.

BACKGROUND

The present disclosure relates to a vehicle driving support device for a vehicle including a collision damage mitigation brake.

In recent years, many vehicles are provided with the collision damage mitigation brake (autonomous emergency braking (AEB)) as one of driving support devices.

In collision damage mitigation brake control, if it is determined that there is a possibility that a vehicle will collide with (or interfere with) another vehicle, an obstacle, or the like, a driver who drives the vehicle is warned, and furthermore, brake control is forcibly disposed. In this manner, the collision damage mitigation brake control avoids a collision of the vehicle with another vehicle, an obstacle, or the like.

If it is determined that there is a possibility that the vehicle will collide with another vehicle such as a preceding vehicle, an oncoming vehicle, or a crossing vehicle, the vehicle driving support device executes the collision damage mitigation brake control. Such collision damage mitigation brake control is disclosed in, for example, Japanese Unexamined Patent Application Publication No. 2021-191660.

SUMMARY

An aspect of the disclosure provides a vehicle driving support device. The vehicle driving support device includes a surrounding environment recognition unit, a travel control unit, and a collision avoidance controller. The surrounding environment recognition unit is configured to acquire surrounding environment information of a surrounding environment ahead of a vehicle. The travel control unit is configured to operate a brake driver of the vehicle. The collision avoidance controller is provided in the travel control unit. The collision avoidance controller includes a vehicle position estimator, an oncoming vehicle recognizer, a collision forecast calculator, and a collision avoidance operation determiner. The vehicle position estimator is configured to estimate a position of the vehicle and generate a forecast traveling path of the vehicle when the vehicle turns across an opposite lane at an intersection. The oncoming vehicle recognizer is configured to recognize an oncoming vehicle traveling on each of lanes of the opposite lane, based on the surrounding environment information. The collision forecast calculator is configured to detect, for each of the lanes, a collision forecast position at which the forecast traveling path of the vehicle intersects with a traveling path of the oncoming vehicle, and forecast a collision of the vehicle with the oncoming vehicle. The collision avoidance operation determiner is configured to determine whether to execute collision avoidance control in which the travel control unit operates the brake driver, for the collision forecast position at which the collision of the vehicle with the oncoming vehicle is forecast by the collision forecast calculator. The collision avoidance controller is configured to dispose the collision avoidance control such that kinetic energy remains in the vehicle in a traveling direction at a collision avoidance position on the forecast traveling path of the vehicle, the collision avoidance position corresponding to the collision forecast position for which the collision avoidance control is to be executed by the collision avoidance operation determiner.

An aspect of the disclosure provides a vehicle driving support device including circuitry. The circuitry is configured to acquire surrounding environment information of a surrounding environment ahead of a vehicle. The circuitry is configured to operate a brake driver of the vehicle. The circuitry is configured to estimate a position of the vehicle and generate a forecast traveling path of the vehicle when the vehicle turns across an opposite lane at an intersection. The circuitry is configured to recognize an oncoming vehicle traveling on each of lanes of the opposite lane, based on the surrounding environment information. The circuitry is configured to detect, for each of the lanes, a collision forecast position at which the forecast traveling path of the vehicle intersects with a traveling path of the oncoming vehicle, and forecast a collision of the vehicle with the oncoming vehicle. The circuitry is configured to determine whether to execute collision avoidance control in which the brake driver is operated, for the collision forecast position at which the collision of the vehicle with the oncoming vehicle is forecast. The circuitry is configured to dispose the collision avoidance control such that kinetic energy remains in the vehicle in a traveling direction at a collision avoidance position on the forecast traveling path of the vehicle, the collision avoidance position corresponding to the collision forecast position for which the collision avoidance control is to be executed.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 3 is a flowchart illustrating an AEB disposition determination process routine;

DETAILED DESCRIPTION

When a vehicle turns across an opposite lane at an intersection (for example, turns right at the intersection in a left-hand traffic area such as Japan or the like), oncoming vehicles often head for the intersection. At this time, a collision damage mitigation brake (AEB) of the vehicle operates, and thereby, there is a possibility that the risk of an accident is increased.

For example, in a case where an oncoming vehicle is approaching while the vehicle is turning at the intersection, if the collision damage mitigation brake (AEB) is operated and the vehicle stops at the intersection, it takes time for the vehicle to restart, and there is a possibility that the risk of an accident with another vehicle increases.

Note that it is possible to solve the above-described problem if a function of road-to-vehicle communication (driving safety support systems), automobile-to-automobile communication (vehicle-to-vehicle), or the like is mounted on the vehicle and the oncoming vehicles. However, the function of the road-to-vehicle communication, the automobile-to-automobile communication, or the like is not mounted on all the vehicles.

It is desirable to provide a vehicle driving support device that reduces the risk of an accident with another vehicle by reasonable collision damage mitigation brake control when the vehicle turns across an opposite lane at an intersection or the like.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
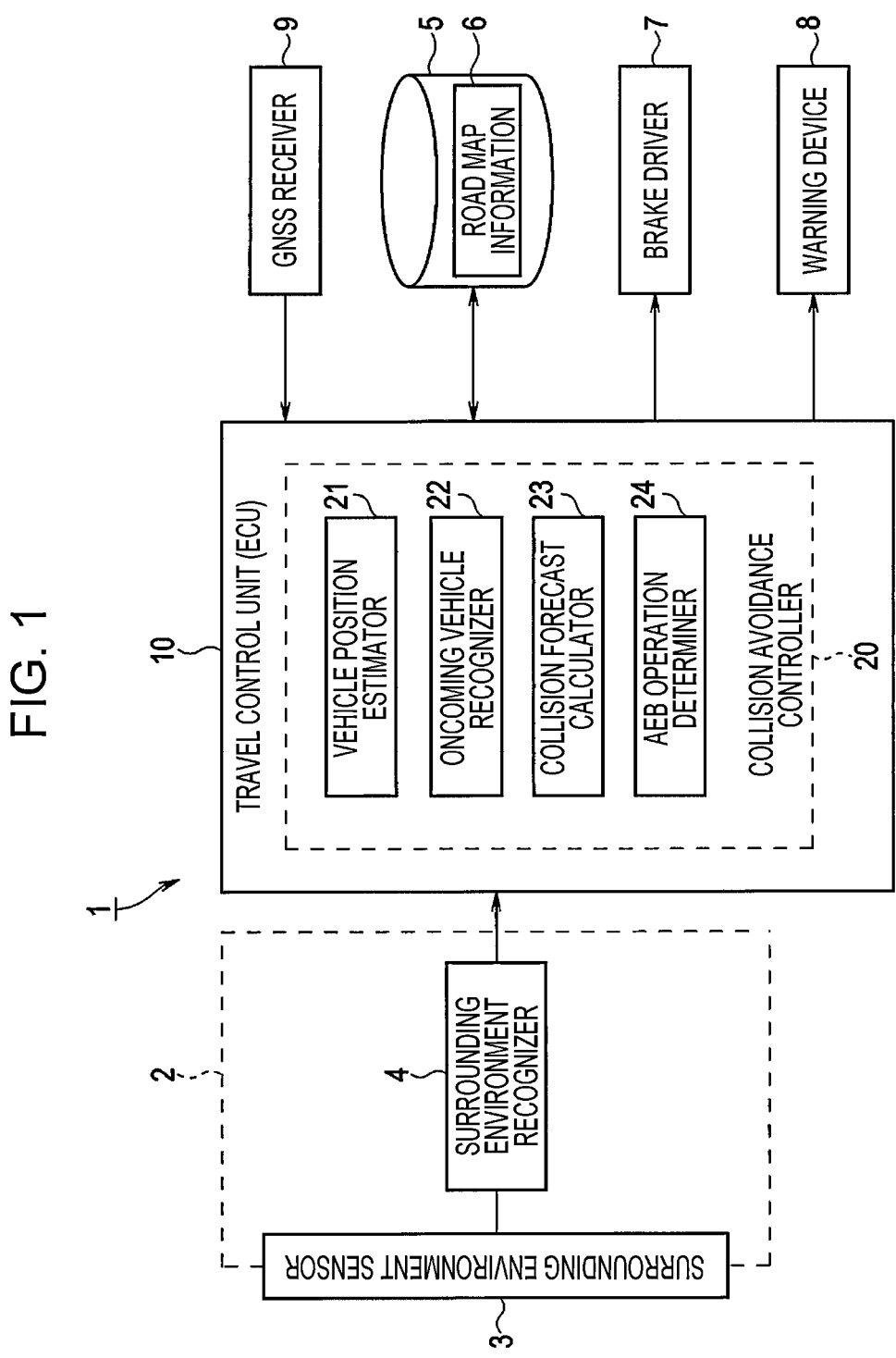
FIG. 1 is a diagram illustrating a schematic configuration of a vehicle driving support device.

A vehicle driving support device 1 illustrated in FIG. 1 is mounted on a vehicle such as an automobile. The vehicle driving support device 1 includes a travel control unit (electronic control unit (ECU)) 10, a surrounding environment recognition unit 2 serving as a surrounding environment information acquirer, a road map database 5, a brake driver 7, and a warning device 8.

The travel control unit 10 executes well-known adaptive cruise control (ACC) and active lane keep (ALK) control. In addition, the travel control unit 10 executes collision damage mitigation brake (autonomous emergency braking (AEB)) control. Note that the ACC and the ALK control executed by the travel control unit 10 are the same as those in the related art, and thus, a detailed description thereof will be omitted.

In the AEB control, if it is determined that there is a possibility that the vehicle will collide with (or interfere with) another vehicle, an obstacle, or the like, the warning device 8 is operated to notify a driver who drives the vehicle. Also, in the AEB control, if necessary, the brake driver 7 is forcibly operated to avoid a collision of the vehicle with another vehicle, an obstacle, or the like.

Another vehicle is any of a preceding vehicle, an oncoming vehicle, and a crossing vehicle. The preceding vehicle and the oncoming vehicle correspond to vehicles ahead of the vehicle. Note that the oncoming vehicle is a vehicle traveling on an opposite lane toward the vehicle. In addition, the crossing vehicle is a vehicle that is traveling on a crossing road that crosses, at an intersection, a vehicle traveling road on which the vehicle is traveling, toward the vehicle traveling road.

The surrounding environment recognition unit 2 includes a surrounding environment sensor 3 and a surrounding environment recognizer 4. The surrounding environment sensor 3 acquires surrounding environment information by sensing the surrounding environment of the vehicle. One or more surrounding environment sensors 3 are disposed, for example, at a front portion, front corner, inner side of a front windshield, or the like of the vehicle.

The surrounding environment sensor 3 includes at least one of devices such as an ultrasonic radar, a millimeter wave radar, light detection and ranging (LiDAR), a stereo camera assembly including a main camera and a sub-camera, and a monocular camera. Note that the surrounding environment sensor 3 may include two or more of these devices in combination.

The surrounding environment recognizer 4 recognizes another vehicle (surrounding vehicle) such as an automobile, a motorcycle, or a bicycle traveling in the surroundings of the vehicle, a road sign, road surface marking, or the like, by a well-known method such as pattern matching, based on the surrounding environment information acquired by the surrounding environment sensor 3. The surrounding environment recognizer 4 then outputs the recognized vehicle information to the travel control unit 10.

The road map database 5 is a large-capacity storage medium such as a hard disk drive (HDD). The road map database 5 stores road map information 6. The road map information 6 includes lane data, road data, on-road structure data, and the like as static information.

The lane data is the number of lanes, lane width data, lane center position coordinate data, traveling azimuth data of the lanes, speed limits, and the like. The road data includes data of intersections, prioritized roads, non-prioritized roads, and the like. The on-road structure data is data of traffic lights, road signs, or the like.

In addition to the surrounding environment recognizer 4 and the road map database 5, a global navigation satellite system (GNSS) receiver 9 that receives positioning signals transmitted from positioning satellites, or the like is coupled to the input side of the travel control unit 10.

The travel control unit 10 and the surrounding environment recognizer 4 are constituted by a well-known microcomputer including a central processing unit (CPU), a random-access memory (RAM), a read-only memory (ROM), and the like, and peripheral devices thereof. The ROM stores in advance a program to be executed by the CPU, fixed data such as a base map, and the like.

The brake driver 7 and the warning device 8 are coupled to the output side of the travel control unit 10. The brake driver 7 supplies a brake fluid pressure to a wheel cylinder of a brake caliper provided on each wheel (not illustrated) to forcibly operate the brake of the vehicle.

On the other hand, the warning device 8 notifies the driver of a warning. The warning device 8 audibly notifies the driver through a voice speaker or visually notifies the driver through a display.

The travel control unit 10 includes a collision avoidance controller 20 as a function of executing the AEB control when another vehicle is detected. The collision avoidance controller 20 includes a vehicle position estimator 21, an oncoming vehicle recognizer 22, a collision forecast calculator 23, and an AEB operation determiner 24. The AEB operation determiner 24 functions as a collision avoidance operation determiner.

The vehicle position estimator 21 acquires position information (latitude, longitude, and altitude) as to where the vehicle is traveling, based on the positioning signals received by the GNSS receiver 9. Then, the vehicle position estimator 21 performs map matching on a road map of the road map information 6 to estimate a current position of the vehicle (vehicle position).

Based on the position information of the vehicle, the vehicle position estimator 21 acquires intersection information ahead on the lane (vehicle traveling road) on which the vehicle is traveling with reference to the road map information 6. The vehicle position estimator 21 also acquires the intersection information ahead on the vehicle traveling road on which the vehicle is traveling, based on the surrounding environment information recognized by the surrounding environment recognizer 4 of the surrounding environment recognition unit 2.

Then, the vehicle position estimator 21 obtains a period until the vehicle arrives at an intersection or the like (intersection arrival period), based on the intersection information. The vehicle position estimator 21 adds a current time to the obtained intersection arrival period. In this way, the vehicle position estimator 21 calculates the time at which the vehicle enters the intersection or the like (intersection entry time).

Furthermore, in a case where the vehicle turns at the intersection or the like, the vehicle position estimator 21 generates a forecast traveling path of the vehicle when the vehicle turns across an opposite lane. Note that the vehicle position estimator 21 receives a vehicle speed, a blinking signal of a direction indicator, steering angle information, and the like.

The oncoming vehicle recognizer 22 recognizes whether an oncoming vehicle traveling on the opposite lane is detected, based on the vehicle information acquired by the surrounding environment recognizer 4. For example, the oncoming vehicle recognizer 22 recognizes the oncoming vehicle traveling on the opposite lane toward the intersection when the vehicle turns across the opposite lane.

In a case where the oncoming vehicle recognizer 22 detects the oncoming vehicle traveling toward the intersection with the vehicle traveling road, the collision forecast calculator 23 calculates the time (crossing time) at which the oncoming vehicle crosses the forecast traveling path of the vehicle at the intersection. Then, the collision forecast calculator 23 compares the time at which the vehicle arrives at the forecast traveling path of the vehicle with the crossing time of the oncoming vehicle to calculate whether there is a possibility that the vehicle and the oncoming vehicle will collide with each other.

In a case where the collision forecast calculator 23 determines that there is a possibility that the vehicle and the oncoming vehicle will collide with each other at the intersection or the like, the AEB operation determiner 24 drives the warning device 8 to notify the driver of the possibility of the collision.

In this manner, the warning device 8 prompts the vehicle to decelerate. In a case where the possibility that the vehicle will collide with the oncoming vehicle is high, the AEB operation determiner 24 operates the brake driver 7. As a result, the vehicle is forcibly decelerated. Thus, the AEB operation determiner 24 decelerates or stops the vehicle to avoid the collision with the oncoming vehicle.

At this time, if a predetermined control disposition cancellation condition is satisfied, the AEB operation determiner 24 does not operate the brake driver 7. As a result, the vehicle is controlled to be able to pass through the intersection without being forcibly decelerated.

In the following description, as a function executed by the travel control unit 10, AEB control for the oncoming vehicle traveling on the opposite lane entering the intersection when the vehicle turns across the opposite lane to turn right or left (turns right in the following description) at the intersection will mainly be described.

In the AEB control of the travel control unit 10, other vehicles as targets of the control include a preceding vehicle, a crossing vehicle, and the like. Since the AEB control for the preceding vehicle, the crossing vehicle, and the like is the same as that in the related art, a description thereof will be omitted.

The vehicle driving support device 1 executes an oncoming vehicle collision determination process at the time of turning across the opposite lane at the intersection, under the control of the collision avoidance controller 20 provided in the travel control unit 10. For example, the process is performed according to an oncoming vehicle collision determination process routine illustrated in FIGS. 2 to 4.

In the following description, a road on which left-hand traffic is defined, such as the road in Japan or the United Kingdom, will be described as an example. Therefore, on a road where right-hand traffic is defined, such as the road in the United States, the control performed by the collision avoidance controller 20 can be applied by replacing the left with the right.

Figure 2:
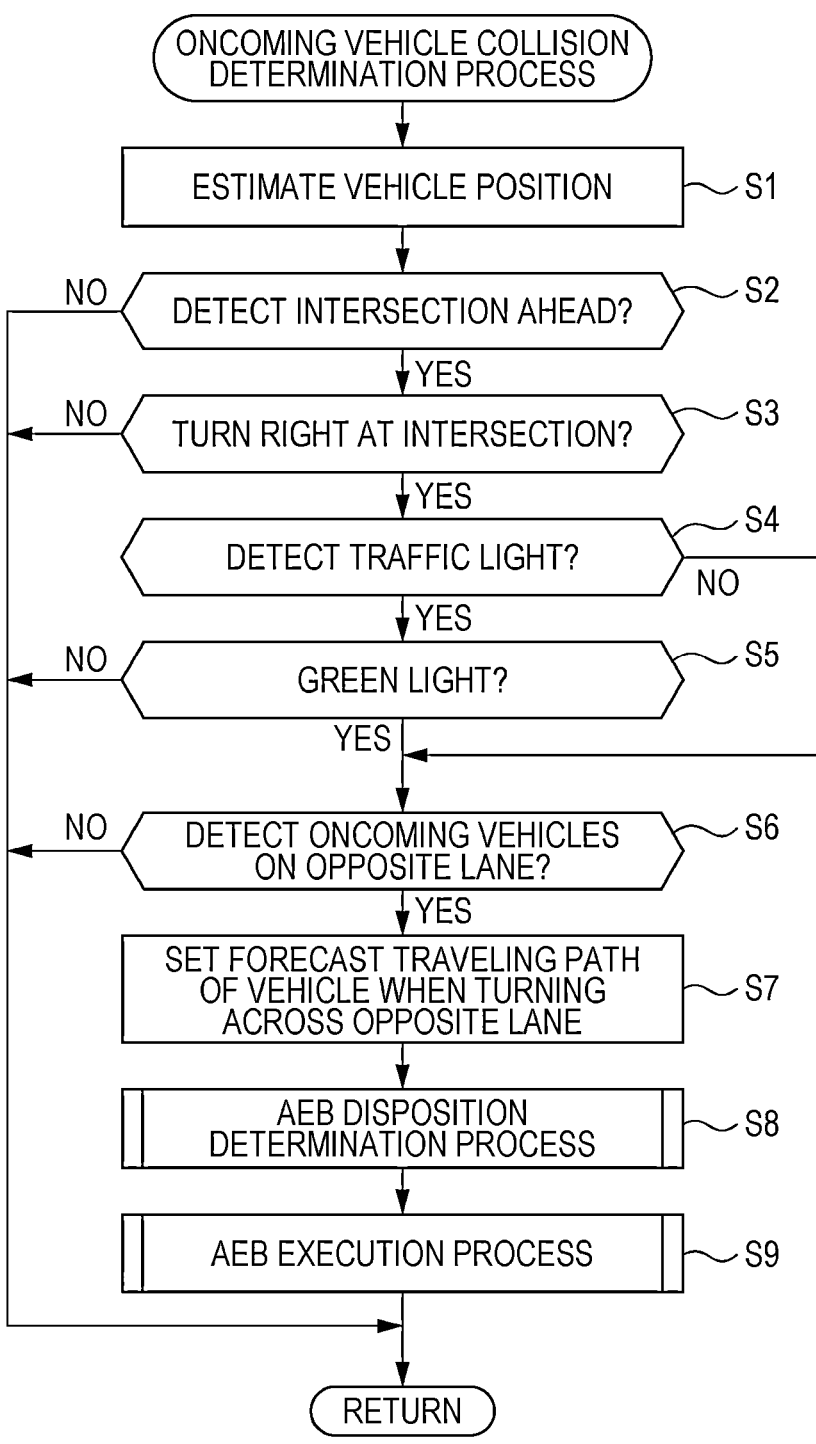
FIG. 2 is a flowchart illustrating an oncoming vehicle collision determination process routine.

As illustrated in FIG. 2, in the oncoming vehicle collision determination process, the collision avoidance controller 20 estimates a vehicle position (S1). The collision avoidance controller 20 causes the vehicle position estimator 21 to acquire position information (latitude, longitude, and altitude) of a current position (vehicle position) of a vehicle M (see FIG. 5) during traveling, in time series, based on the positioning signals received by the GNSS receiver 9.

Then, the vehicle position estimator 21 performs map matching of the acquired position information on the road map of the road map information 6. The vehicle position estimator 21 estimates the ever-changing current position (vehicle position) of the vehicle M. In addition, the vehicle position estimator 21 specifies the traveling road (vehicle traveling road) on which the vehicle M is traveling and the traveling direction.

Subsequently, the collision avoidance controller 20 determines whether an intersection is detected ahead (S2). The collision avoidance controller 20 causes the vehicle position estimator 21 to detect whether there is an intersection at a predetermined position ahead of (in several hundred meters [m] from) the current position on the vehicle traveling road on which the vehicle M is traveling, based on the surrounding environment information and the road map information.

If the intersection is detected (step S2: YES), the collision avoidance controller 20 proceeds to step S3. If the intersection is not detected (step S2: NO), the collision avoidance controller 20 exits the routine, returns to step S1, and repeatedly executes the subsequent process. In step S3, the collision avoidance controller 20 determines whether the vehicle M will turn right at the intersection (S3). The collision avoidance controller 20 detects whether the vehicle M will turn right at the intersection, based on a signal input such as a lighting operation of a direction indicator (not illustrated) or a steering operation.

Note that the collision avoidance controller 20 determines that the vehicle M will turn right also if the vehicle position identified by the vehicle position estimator 21 is on a right turn lane provided in front of the intersection, for example. If the vehicle M does not turn right at the intersection, the collision avoidance controller 20 exits the routine, returns to step S1, and repeatedly executes the subsequent process. That is, the collision avoidance controller 20 determines that the vehicle M does not turn at the intersection and travels straight on the vehicle traveling road.

If the collision avoidance controller 20 determines that the vehicle M will turn right at the intersection (step S3: YES), the collision avoidance controller 20 proceeds to step S4. If the collision avoidance controller 20 determines that the vehicle M will not turn right at the intersection (step S3: NO), the collision avoidance controller 20 exits the routine, returns to step S1, and repeatedly executes the subsequent process.

In step S4, the collision avoidance controller 20 determines whether there is a traffic light at the intersection (S4). The collision avoidance controller 20 causes the vehicle position estimator 21 to detect whether there is a traffic light at the intersection, based on the surrounding environment information and the intersection information stored in the road map information.

If the traffic light is detected (step S4: YES), the collision avoidance controller 20 proceeds to step S5. If the traffic light is not detected (step S4: NO), the collision avoidance controller 20 proceeds to step S6.

In step S5, the collision avoidance controller 20 determines whether the detected traffic light is green (S5). The collision avoidance controller 20 detects whether the traffic light is green, based on the surrounding environment information.

Then, if the traffic light is green (step S5: YES), the collision avoidance controller 20 proceeds to step S6. If the traffic light is not green, such as red (step S5: NO), the collision avoidance controller 20 exits the routine, returns to step S1, and repeatedly executes the subsequent process.

If an arrow signal attached to the traffic light is green, the vehicle M can preferentially turn right at the intersection, and therefore, the collision avoidance controller 20 exits the routine, returns to step S1, and repeatedly executes the subsequent process.

Figure 5:
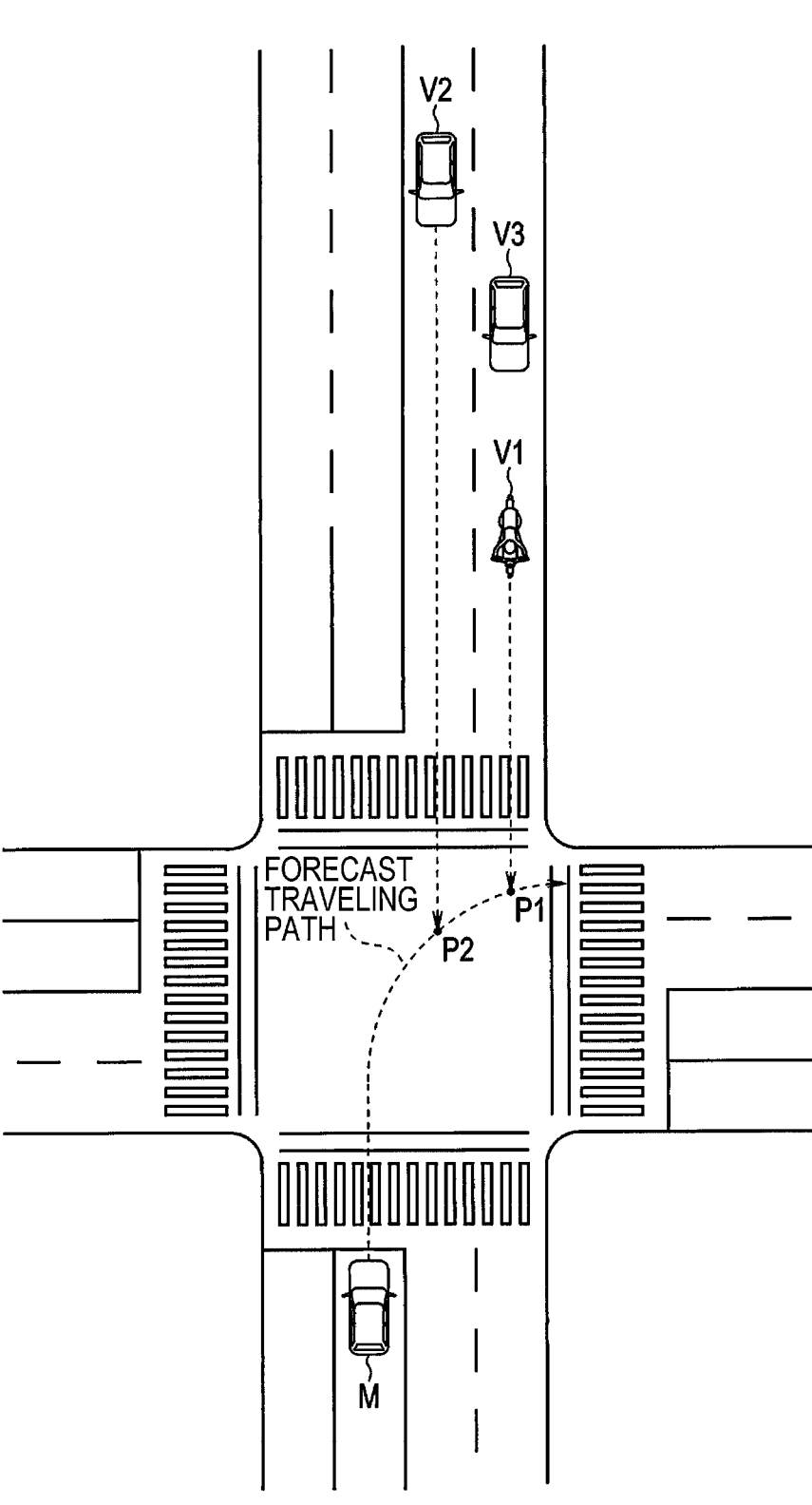
FIG. 5 is a diagram illustrating a target forecast traveling path when a vehicle turns right at an intersection, and illustrating a state in which oncoming vehicles are traveling on an opposite lane.

In step S6, the collision avoidance controller 20 determines whether oncoming vehicles V (for example, an oncoming motorcycle V1, oncoming automobiles V2 and V3, and the like as oncoming vehicles illustrated in FIG. 5) are detected on the opposite lane (S6). At this time, the collision avoidance controller 20 causes the oncoming vehicle recognizer 22 to detect whether there is an oncoming vehicle V traveling in the opposite lane toward the intersection, based on the surrounding environment information.

If the oncoming vehicle recognizer 22 detects the oncoming vehicle V (step S6: YES), the collision avoidance controller 20 proceeds to step S7. If the oncoming vehicle recognizer 22 does not detect the oncoming vehicle V (step S6: NO), the collision avoidance controller 20 exits the routine, returns to step S1, and repeatedly executes the subsequent process.

In step S7, the collision avoidance controller 20 sets the forecast traveling path of the vehicle M when the vehicle M turns across the opposite lane (S7). The collision avoidance controller 20 causes the vehicle position estimator 21 to set the forecast traveling path of the vehicle M when the vehicle M turns across the opposite lane, herein, when the vehicle M turns right at the intersection, which is illustrated by a broken line in FIG. 5. Since the setting of the forecast traveling path of the vehicle M is the same as the control in the related art, a detailed description thereof will be omitted.

Subsequently, the collision avoidance controller 20 executes an AEB disposition determination process (S8). The AEB disposition determination process is a sub-routine processed by the collision avoidance controller 20 according to the routine in FIG. 3.

In the AEB disposition determination process illustrated in FIG. 3, the collision avoidance controller 20 determines whether the oncoming vehicle V is detected on an n-th lane of the opposite lane (S11). The collision avoidance controller 20 causes the oncoming vehicle recognizer 22 to detect the oncoming vehicle V on the n-th lane of the opposite lane, based on the surrounding environment information.

At this time, the oncoming vehicle recognizer 22 first detects the oncoming vehicle V in order from a first lane (n=1) of the opposite lane, which is the farthest from the vehicle M. That is, the oncoming vehicle recognizer 22 detects the oncoming vehicle V in order from the n-th lane (n=min). Note that the oncoming vehicle recognizer 22 may alternatively first detect the oncoming vehicle V in order from the n-th lane (n=max) of the opposite lane, which is the closest to the vehicle M.

If the oncoming vehicle recognizer 22 detects the oncoming vehicle V on the n-th lane of the opposite lane (step S11: YES), the collision avoidance controller 20 proceeds to step S12. If the oncoming vehicle recognizer 22 does not detect the oncoming vehicle V on the n-th lane of the opposite lane (step S11: NO), the collision avoidance controller 20 proceeds to step S19.

Figure 6:
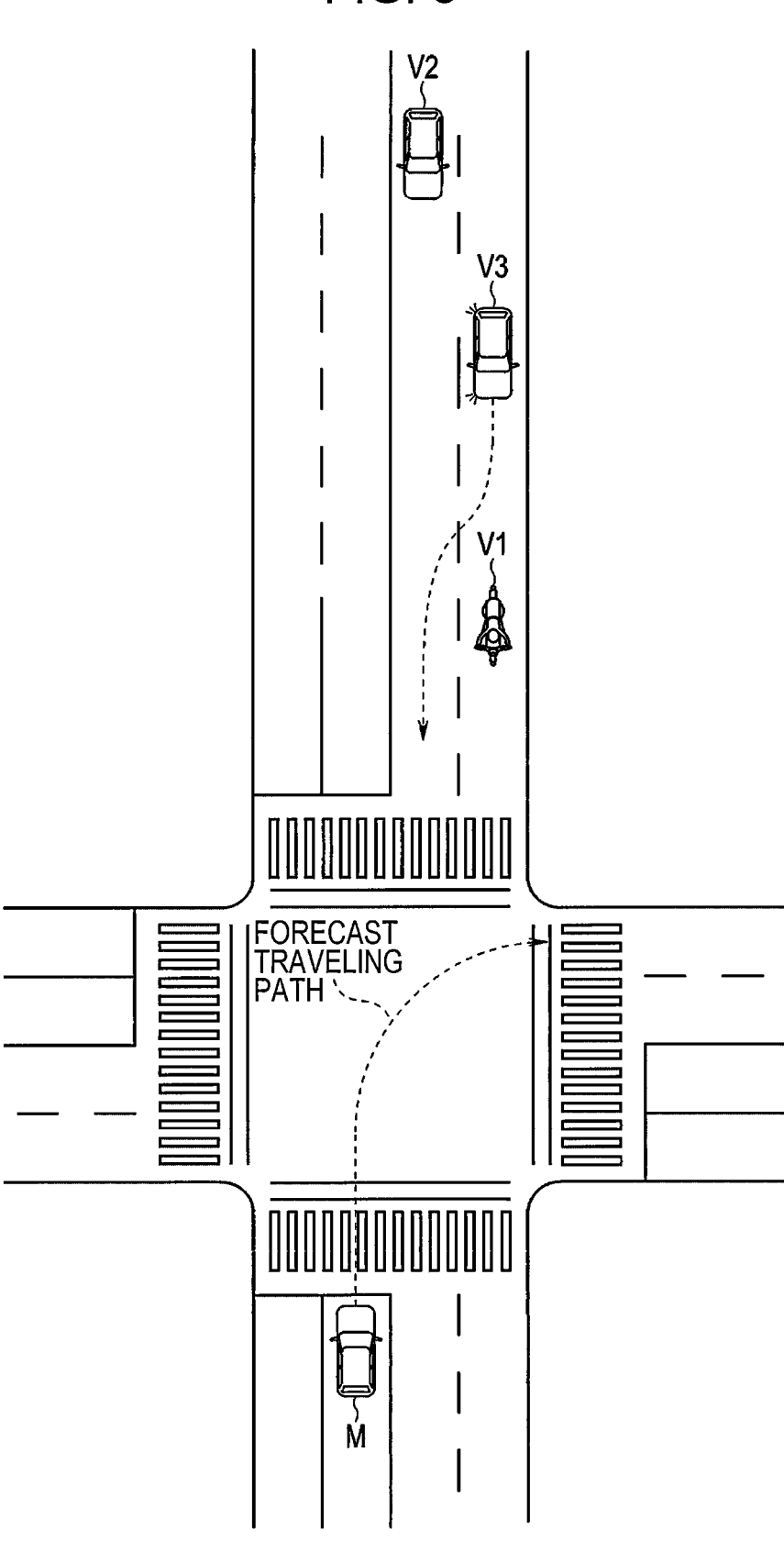
FIG. 6 is a diagram illustrating a state in which there is an automobile that changes lanes to overtake an oncoming motorcycle on the opposite lane at the time of detection of oncoming vehicles when the vehicle turns right at the intersection.

In step S12, the collision avoidance controller 20 determines whether there is a vehicle that changes lanes to the front of the oncoming vehicle V (S12). If the oncoming vehicle V is detected on a second lane (n=2), for example, as illustrated in FIG. 6, the collision avoidance controller 20 causes the oncoming vehicle recognizer 22 to detect the oncoming automobile V3 or the like that changes lanes to the second lane in order to overtake the oncoming motorcycle V1 traveling on the first lane. Note that the oncoming vehicle recognizer 22 determines the lane change of the oncoming automobile V3 by blinking of a direction indicator or the like.

If the oncoming vehicle recognizer 22 detects the vehicle that changes lanes to the front of the oncoming vehicle V (step S12: YES), the collision avoidance controller 20 proceeds to step S13. If the oncoming vehicle recognizer 22 does not detect the vehicle that changes lanes to the front of the oncoming vehicle V (step S12: NO), the collision avoidance controller 20 proceeds to step S14.

In step S13, the collision avoidance controller 20 sets the lane-changing vehicle as the oncoming vehicle V on the n-th lane (S13). For example, as illustrated in FIG. 6, the collision avoidance controller 20 causes the collision forecast calculator 23 to set, as the oncoming vehicle V, the oncoming automobile V3 that changes lanes from the first lane to the second lane.

Subsequently, the collision avoidance controller 20 calculates an arrival time Tmn of the vehicle M at a collision forecast point Pn, which is a collision forecast position at which a collision with the oncoming vehicle V is forecast on the forecast traveling path of the vehicle M (S14). The collision avoidance controller 20 causes the collision forecast calculator 23 to detect the collision forecast point Pn at which the oncoming vehicle V intersects with the forecast traveling path of the vehicle M in a case where the oncoming vehicle V travels straight.

At this time, the collision forecast calculator 23 obtains a period (arrival period) until the vehicle M arrives at the collision forecast point Pn by dividing the distance from the vehicle position to the collision forecast point Pn by the vehicle speed. Subsequently, the collision forecast calculator 23 adds the current time to the arrival period to calculate the arrival time Tmn of the vehicle M at the collision forecast point Pn.

Note that the vehicle speed of the vehicle M is detected by a vehicle speed sensor (not illustrated). The distance to the collision forecast point Pn of the vehicle M is obtained by measuring the travel distance to the collision forecast point Pn on the vehicle forecast traveling path. At this time, the collision avoidance controller 20 causes the oncoming vehicle recognizer 22 to calculate the distance to the collision forecast point Pn, based on the surrounding environment information acquired by the surrounding environment recognizer 4 of the surrounding environment recognition unit 2.

Subsequently, the collision avoidance controller 20 calculates an arrival time Tvn of the oncoming vehicle V at the collision forecast point Pn (S15). The collision avoidance controller 20 causes the oncoming vehicle recognizer 22 to detect the position and the vehicle speed of the oncoming vehicle V. At this time, the oncoming vehicle recognizer 22 detects the relative distance and the relative speed to the vehicle M from vehicle information of the oncoming vehicle V input from the surrounding environment recognizer 4.

Then, the collision avoidance controller 20 calculates the distance of the oncoming vehicle V to the collision forecast point Pn on the forecast traveling path and the vehicle speed thereof, based on the relative distance and the relative speed to the vehicle M. Note that the vehicle speed of the oncoming vehicle V can also be obtained based on a movement amount of the oncoming vehicle V detected in time series.

Subsequently, the collision avoidance controller 20 causes the collision forecast calculator 23 to calculate a period (arrival period) until the oncoming vehicle V arrives at the collision forecast point Pn by dividing the distance of the oncoming vehicle V to the collision forecast point Pn by the vehicle speed.

Then, the collision forecast calculator 23 adds the current time to the arrival period for the collision forecast point Pn to calculate the arrival time Tvn of the oncoming vehicle V at the collision forecast point Pn.

The collision forecast calculator 23 calculates an absolute value |Tmn−Tvn| of the difference between the arrival time Tmn of the vehicle M at the collision forecast point Pn and the arrival time Tvn of the oncoming vehicle V at the collision forecast point Pn, and compares the absolute value with a predetermined threshold Tnth of a collision determination period.

Then, the collision avoidance controller 20 determines whether the absolute value |Tmn−Tvn| of the difference between the arrival time Tmn of the vehicle M at the collision forecast point Pn and the arrival time Tvn of the oncoming vehicle V at the collision forecast point Pn is less than or equal to the predetermined threshold Tnth of the collision determination period (S16).

The predetermined threshold Tnth of the collision determination period is a time width in which there is a possibility that the vehicle M and the oncoming vehicle V will collide with each other at the collision forecast point Pn, and is obtained and set in advance from an experiment or the like. Note that the predetermined threshold Tnth of the collision determination period is determined by, for example, adding a value to a reaction period (for example, 2 seconds) of a driver who drives the oncoming vehicle V, and the value is obtained by dividing the vehicle speed of the oncoming vehicle V by a deceleration (for example, 3 m/s$^2$) that can be generally performed by the driver of the oncoming vehicle V.

Then, if the absolute value |Tmn−Tvn| of the difference calculated by the collision forecast calculator 23 is less than or equal to the predetermined threshold Tnth of the collision determination period (|Tmn−Tvn|≤Tnth) (step S16: YES), the collision avoidance controller 20 causes the AEB operation determiner 24 to determine that there is a possibility that the vehicle M and the oncoming vehicle V will collide with each other, and proceeds to step S17.

If the absolute value |Tmn−Tvn| of the difference calculated by the collision forecast calculator 23 is not less than or equal to the predetermined threshold Tnth of the collision determination period (|Tmn−Tvn|<Tnth) (step S16: NO), the collision avoidance controller 20 causes the AEB operation determiner 24 to determine that the vehicle M and the oncoming vehicle V can pass through the collision forecast point Pn without colliding with each other, and proceeds to step S18.

That is, if the arrival time Tmn of the vehicle M at the collision forecast point Pn is earlier than the arrival time Tvn of the oncoming vehicle V at the collision forecast point Pn (Tmn<Tvn) and the absolute value |Tmn−Tvn| of the difference therebetween exceeds the predetermined threshold Tnth of the collision determination period (|Tmn−Tvn|>Tnth), the vehicle M passes through the collision forecast point Pn earlier than the oncoming vehicle V.

If the arrival time Tvn of the oncoming vehicle V at the collision forecast point Pn is earlier than the arrival time Tmn of the vehicle M at the collision forecast point Pn (Tvn<Tmn) and the absolute value |Tmn−Tvn| of the difference therebetween exceeds the predetermined threshold Tnth of the collision determination period (|Tmn−Tvn|>Tnth), the oncoming vehicle V passes through the collision forecast point Pn earlier than the vehicle M.

By satisfying these conditions, the vehicle M can pass through the collision forecast point Pn without colliding with the oncoming vehicle V.

By the AEB operation determiner 24 determining that the vehicle M and the oncoming vehicle V will collide with each other (step S16: YES), then in step S17, the collision avoidance controller 20 sets a flag *1 of the collision forecast point Pn (Pn←*1) (S17), and proceeds to step S19.

On the other hand, by the AEB operation determiner 24 determining that the oncoming vehicle V and the vehicle M do not collide with each other (step S16: NO), then in step S18, the collision avoidance controller 20 sets a flag *0 of the collision forecast point Pn (Pn←*0) (S18), and proceeds to step S19.

In step S19, the collision avoidance controller 20 determines whether an (n+1)-th lane is present closer to the vehicle M than the n-th lane (S19). The collision avoidance controller 20 causes the oncoming vehicle recognizer 22 to detect whether the (n+1)-th lane is present closer to the vehicle M than the n-th lane, based on the surrounding environment information.

If the (n+1)-th lane is present (step S19: YES), the collision avoidance controller 20 returns to step S11, and repeatedly executes the process in and after step S11 for the (n+1)-th lane. That is, the collision avoidance controller 20 repeatedly executes the AEB disposition determination process in FIG. 3 according to the number of lanes of the opposite lane.

On the other hand, if the (n+1)-th lane is not present (step S19: NO), the collision avoidance controller 20 ends the AEB disposition determination process, and proceeds to step S9 of the oncoming vehicle collision determination process illustrated in FIG. 2.

Note that the oncoming vehicle recognizer 22 may first detect the oncoming vehicle V in order from the n-th lane (n=max) of the opposite lane, which is the closest to the vehicle, and in step S19 in this case, determines whether an (n−1)-th lane is present farther away from the vehicle M than the n-th lane.

In step S9 of the oncoming vehicle collision determination process illustrated in FIG. 2, the collision avoidance controller 20 executes an AEB execution process (S9). The AEB execution process is a sub-routine processed by the collision avoidance controller 20 according to the routine in FIG. 4.

Figure 4:
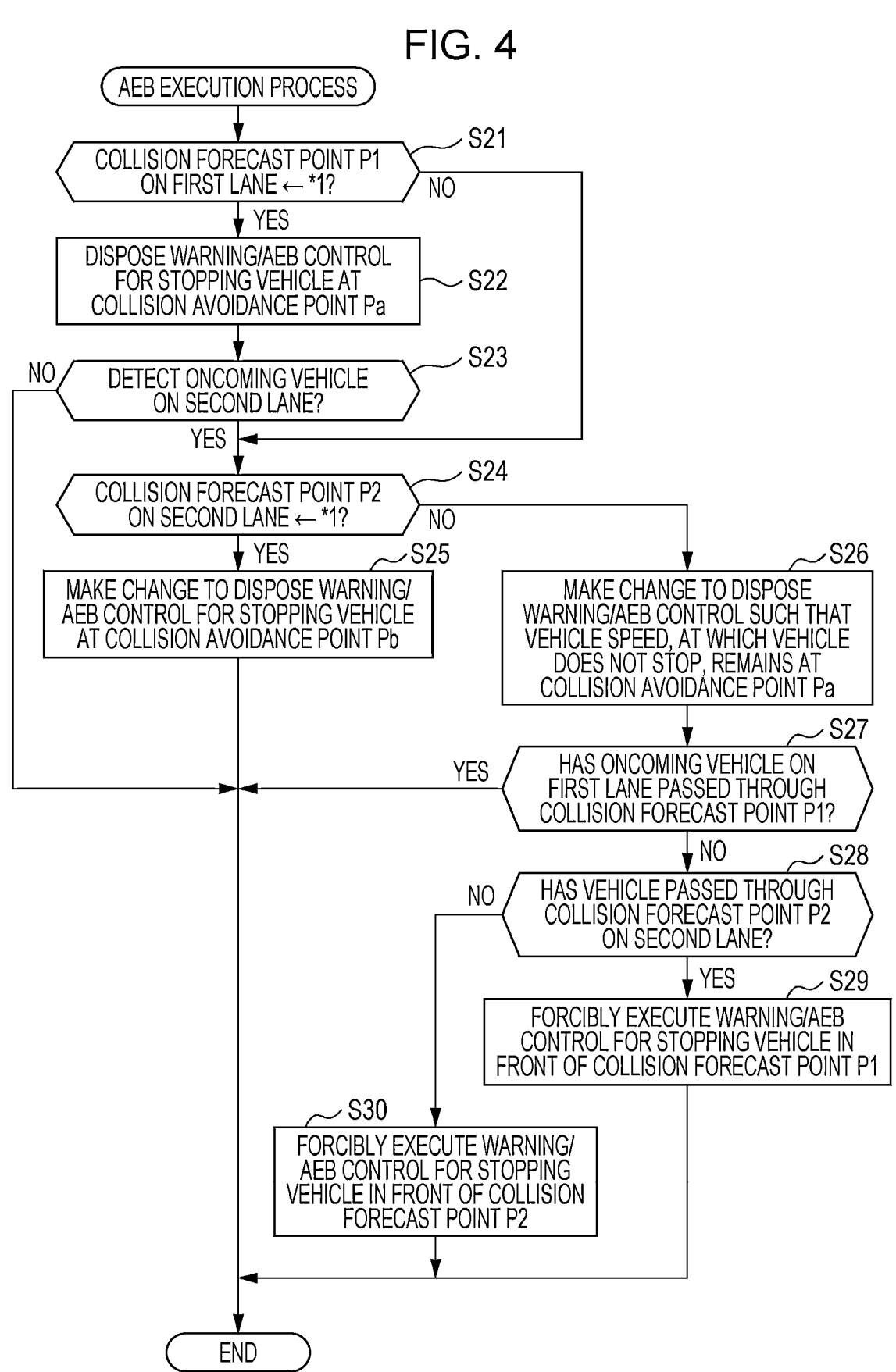
FIG. 4 is a flowchart illustrating an AEB execution process routine.

In the AEB execution process illustrated in FIG. 4, the collision avoidance controller 20 determines whether the flag *1 of a collision forecast point P1 (P1←*1) on the first lane is set (S21). The collision avoidance controller 20 determines whether the flag *1 of the collision forecast point P1 (P1←*1) on the first lane, which is determined by the AEB operation determiner 24 in step S17 in FIG. 3, is set.

Then, if the flag *1 of the collision forecast point P1 (P1←*1) on the first lane is set (step S21: YES), the collision avoidance controller 20 proceeds to step S22.

On the other hand, if the flag *1 of the collision forecast point P1 (P1←*1) on the first lane is not set (step S21: NO), the collision avoidance controller 20 proceeds to step S24. That is, if the flag *0 of the collision forecast point P1 (P1←*0) on the first lane is set, the collision avoidance controller 20 proceeds to step S24.

Figure 7:
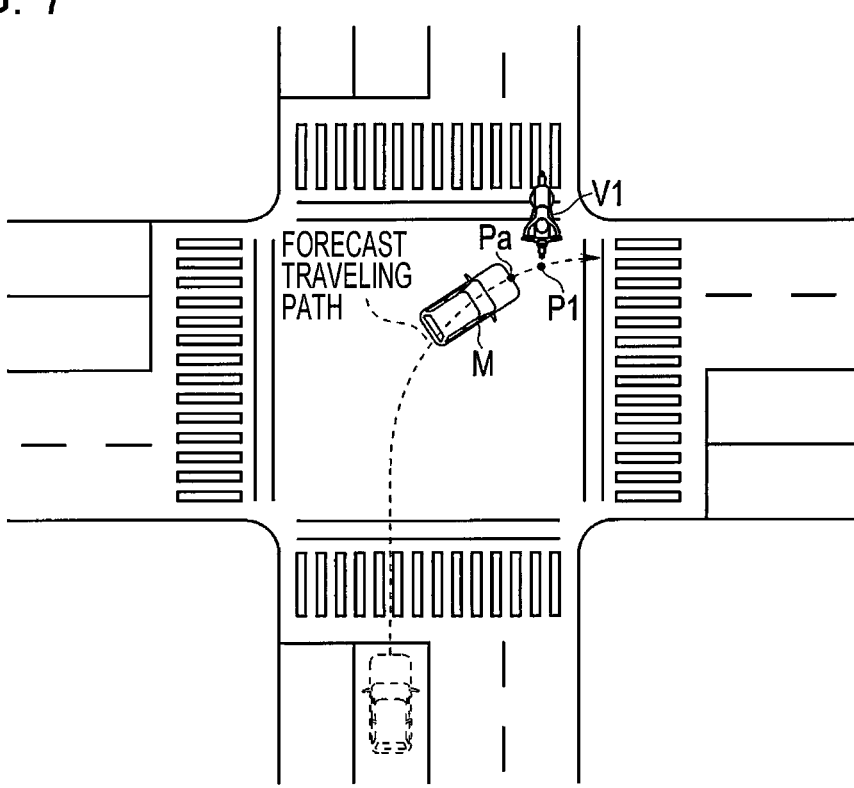
FIG. 7 is a diagram illustrating a response of the vehicle when avoiding a collision with the oncoming motorcycle on a first lane at the intersection.

In step S22, the collision avoidance controller 20 disposes warning/AEB control for stopping the vehicle M at a collision avoidance point Pa that is a collision avoidance position. Note that, for example, as illustrated in FIG. 7, the collision avoidance point Pa is set in front of the collision forecast point P1 on the forecast traveling path of the vehicle M in order to avoid, herein, a collision of the vehicle M with the oncoming motorcycle V1, which is the oncoming vehicle V. The collision avoidance point Pa herein is a position in the front of the vehicle M on the forecast traveling path of the vehicle M at which the vehicle M does not come into contact with or collide with the oncoming vehicle V.

In step S23, the collision avoidance controller 20 determines whether the oncoming vehicle V is detected on the second lane (S23). The collision avoidance controller 20 causes the oncoming vehicle recognizer 22 to detect the oncoming vehicle V (herein, the oncoming automobile V2) on the second lane of the opposite lane, based on the surrounding environment information.

If the oncoming vehicle recognizer 22 detects the oncoming vehicle V on the second lane of the opposite lane (step S23: YES), the collision avoidance controller 20 proceeds to step S24. If the oncoming vehicle recognizer 22 does not detect the oncoming vehicle V on the second lane of the opposite lane (step S23: NO), the collision avoidance controller 20 ends the AEB execution process or proceeds to the following step S.

In step S24, the collision avoidance controller 20 determines whether the flag *1 of a collision forecast point P2 (P2←*1) on the second lane is set (S24). The collision avoidance controller 20 determines whether the flag *1 of the collision forecast point P2 (P2←*1) on the second lane, which is determined by the AEB operation determiner 24 in step S17 in FIG. 3, is set.

Then, if the flag *1 of the collision forecast point P2 (P2←*1) on the second lane is set (step S24: YES), the collision avoidance controller 20 proceeds to step S25. On the other hand, if the flag *1 of the collision forecast point P2 (P2←*1) on the second lane is not set (step S24: NO), the collision avoidance controller 20 proceeds to step S26.

Figure 8:
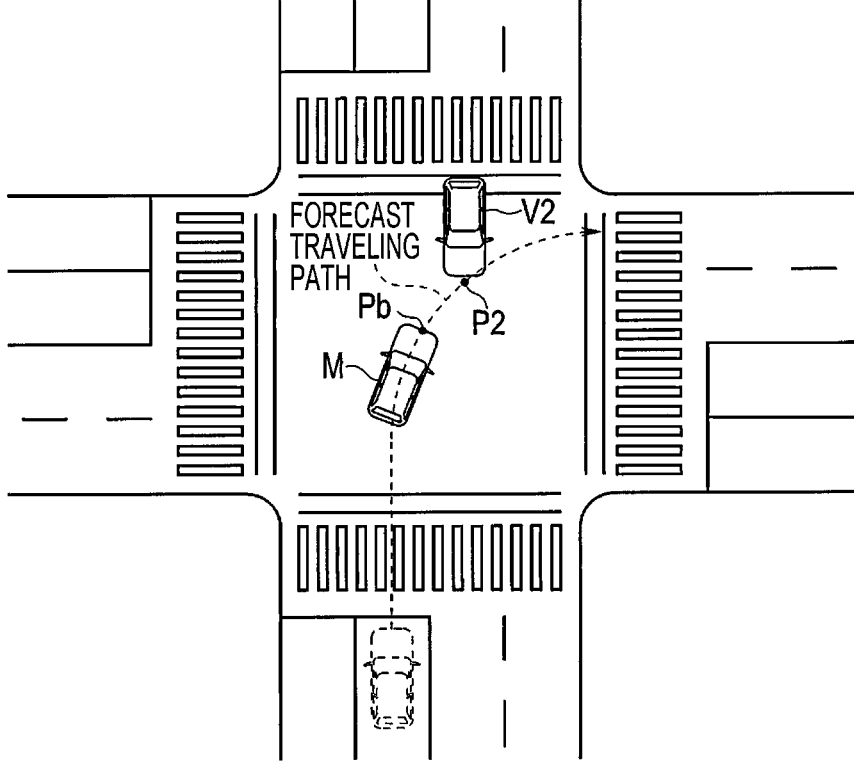
FIG. 8 is a diagram illustrating a response of the vehicle when avoiding a collision with an oncoming automobile on a second lane at the intersection.

In step S25, the collision avoidance controller 20 makes a change to dispose the warning/AEB control for stopping the vehicle M at a collision avoidance point Pb that is a collision avoidance position. Note that, for example, as illustrated in FIG. 8, the collision avoidance controller 20 sets the collision avoidance point Pb in front of the collision forecast point P2 on the second lane in order to avoid, herein, a collision of the vehicle M with the oncoming automobile V2, which is the oncoming vehicle V, on the forecast traveling path of the vehicle M. The collision avoidance controller 20 ends the AEB execution process or proceeds to the following step S. The collision avoidance point Pb is also a position in the front of the vehicle M at which the vehicle M does not come into contact with or collide with the oncoming vehicle V.

In step S26, the collision avoidance controller 20 makes a change to dispose the warning/AEB control such that a predetermined vehicle speed, at which the vehicle M does not stop, remains at the collision avoidance point Pa that is a collision avoidance position (S26). Herein, the collision avoidance controller 20 executes the AEB control with a brake assist amount such that the vehicle M decelerates to the collision avoidance point Pa and the predetermined vehicle speed, at which the vehicle M does not stop, remains, and at the collision avoidance point Pa, the collision with the oncoming vehicle V (the oncoming motorcycle V1) traveling on the first lane is avoided.

That is, the vehicle M increases the deceleration to the collision avoidance point Pa, and kinetic energy remains in the traveling direction at the collision avoidance point Pa. Therefore, the vehicle M is easily re-accelerated compared to starting from a stop. Note that the predetermined vehicle speed (Vm) at the collision avoidance point Pa is set in advance to, for example, 0 km/h<Vm<10 km/h, which is a vehicle speed at which the vehicle M can stop as soon as the brake is applied.

Subsequently, the collision avoidance controller 20 determines whether the oncoming vehicle V traveling on the first lane has passed through the collision forecast point P1 (S27). The collision avoidance controller 20 determines whether the oncoming vehicle V (herein, the oncoming motorcycle V1) on the first lane of the opposite lane has passed through the collision forecast point P1, based on the surrounding environment information.

If the oncoming vehicle V (the oncoming motorcycle V1) has passed through the collision forecast point P1 (step S27:

YES), the collision avoidance controller 20 ends the AEB execution process or proceeds to the following step S.

Figure 9:
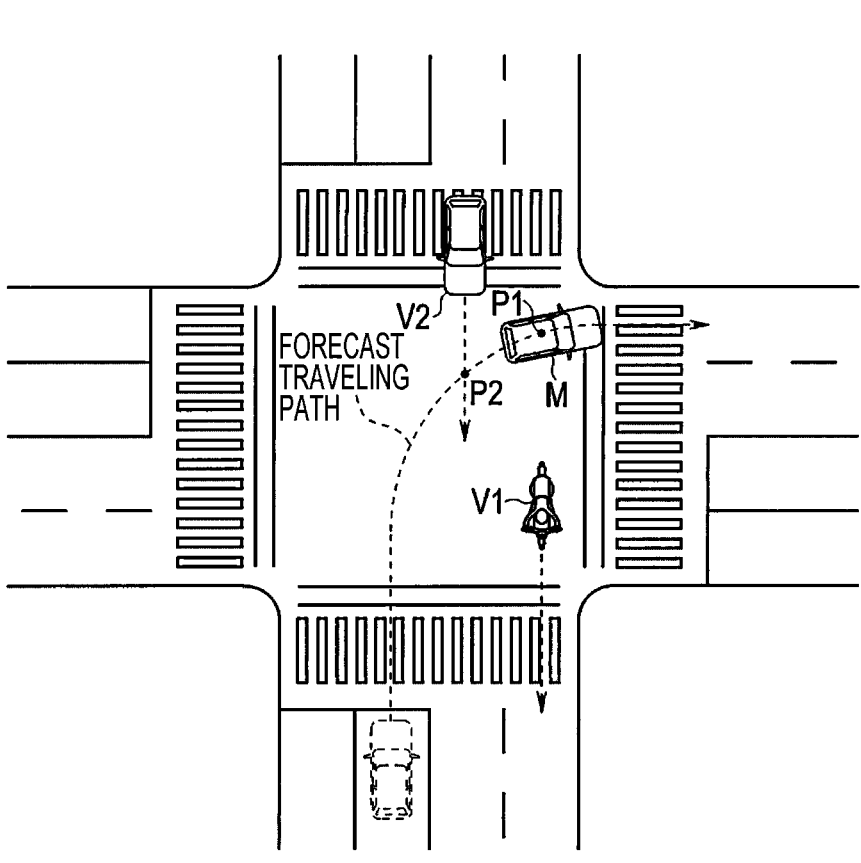
FIG. 9 is a diagram illustrating a response of the vehicle when, after avoiding the collision with the oncoming motorcycle on the first lane at the intersection, restarting to turn right.

At this time, for example, as illustrated in FIG. 9, the oncoming motorcycle V1, which is the oncoming vehicle V on the first lane, has passed through the collision forecast point P1 and the oncoming automobile V2, which is the oncoming vehicle V on the second lane, is yet to reach the collision forecast point P2. Therefore, by re-accelerating, the vehicle M can turn right and pass through the intersection without colliding with the oncoming motorcycle V1 and the oncoming automobile V2.

On the other hand, if the oncoming vehicle V (the oncoming motorcycle V1) has not passed through the collision forecast point P1 by decelerating or the like (step S27: NO), the collision avoidance controller 20 proceeds to step S28.

In step S28, the collision avoidance controller 20 determines whether the vehicle M has passed through the collision forecast point P2 on the second lane (S28). The collision avoidance controller 20 determines whether the vehicle M has passed through the collision forecast point P2 on the second lane, based on the surrounding environment information.

If the vehicle M has passed through the collision forecast point P2 (step S28: YES), the collision avoidance controller 20 proceeds to step S29. On the other hand, if the vehicle M has not passed through the collision forecast point P2 (step S28: NO), the collision avoidance controller 20 proceeds to step S30.

In step S29, the collision avoidance controller 20 forcibly executes the warning/AEB control for stopping the vehicle M in front of the collision forecast point P1 (S29), and ends the AEB execution process or proceeds to the following step S.

Herein, the collision avoidance controller 20 forcibly executes the AEB control for stopping the vehicle M in front of and as close to the collision forecast point P1 as possible at which the vehicle M collides with the oncoming vehicle V (the oncoming motorcycle V1) traveling on the first lane.

Figure 10:
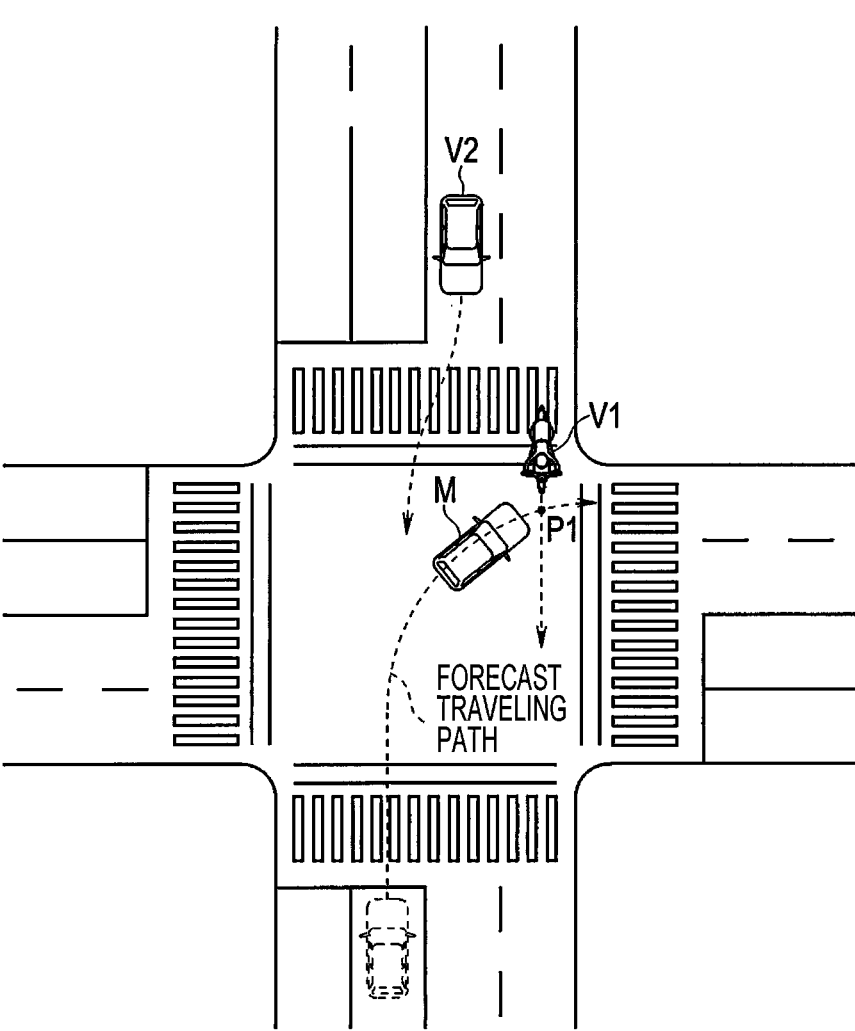
FIG. 10 is a diagram illustrating a response of the vehicle when forcibly stopping in front of a collision forecast position at which the collision with the oncoming motorcycle on the first lane at the intersection is forecast.

At this time, for example, as illustrated in FIG. 10, the vehicle M can suddenly stop in front of the collision forecast point P1 to avoid the collision with the oncoming motorcycle V1, which is the oncoming vehicle V traveling on the first lane. In addition, the vehicle M can also avoid a collision with the right side of the vehicle M by the oncoming automobile V2, which is the oncoming vehicle V traveling in the second lane.

In step S30, the collision avoidance controller 20 forcibly executes the warning/AEB control for stopping the vehicle M in front of the collision forecast point P2 (S30), and ends the AEB execution process or proceeds to the following step S.

Herein, the collision avoidance controller 20 forcibly executes the AEB control for stopping the vehicle M in front of and as close to the collision forecast point P2 as possible at which the vehicle M collides with the oncoming vehicle V (the oncoming automobile V2) traveling on the second lane.

Figure 11:
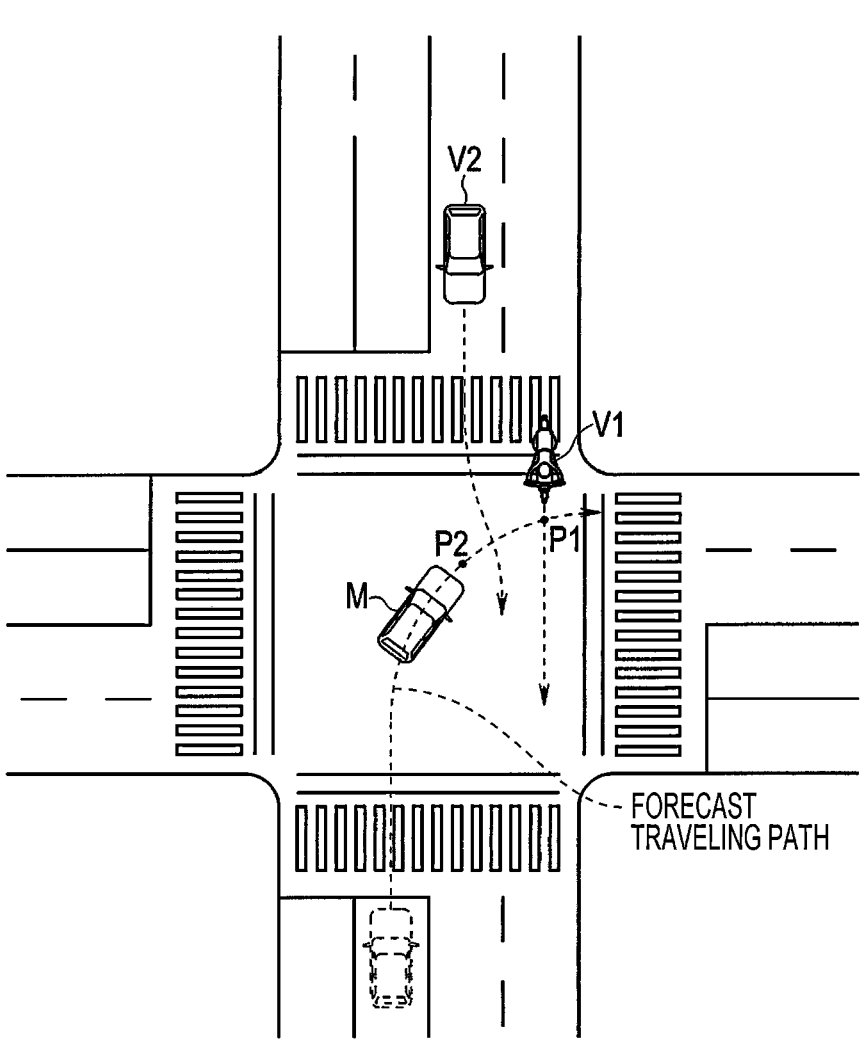
FIG. 11 is a diagram illustrating a response of the vehicle when stopping in front of a collision forecast position at which the collision with the oncoming automobile on the second lane at the intersection is forecast.

At this time, for example, as illustrated in FIG. 11, the vehicle M can suddenly stop in front of the collision forecast point P2 to avoid a collision with the left side of the vehicle M by the oncoming automobile V2, which is the oncoming vehicle V traveling in the second lane.

Even if the vehicle M stops in front of either one of the collision forecast points P1 and P2, the vehicle M is under the condition of not colliding with the oncoming automobile V2, which is the oncoming vehicle V traveling in the second lane, according to the determination routine in step S24. Therefore, by decelerating, a driver who drives the oncoming automobile V2 can avoid the collision with the vehicle M.

Note that an example in which the opposite lane includes up to the second lane in which two lanes are present on each side is illustrated in the above description. In a case where the opposite lane includes a third lane or more, the collision avoidance controller 20 executes the setting for making a change to dispose the warning/AEB control for stopping the vehicle M at a collision avoidance point according to the number of lanes.

Upon the ending of the above AEB execution process in step S9 in the oncoming vehicle collision determination process illustrated in FIG. 2, the collision avoidance controller 20 returns to step S1, and repeatedly executes the subsequent process.

If the warning/AEB control disposition is set by the collision avoidance controller 20 when the vehicle M turns across the opposite lane at the intersection (when the vehicle M turns right in the above description), the travel control unit 10 drives the warning device 8 to notify the driver that the possibility of the collision with the oncoming vehicle V is high.

Then, the travel control unit 10 obtains brake assist amounts corresponding to the positions of the collision avoidance points Pa and Pb at which the collision with the oncoming vehicle V is avoided. In this state, if it is determined that it is difficult to avoid the collision by a collision avoidance operation (mainly, brake operation) performed by the driver, the travel control unit 10 forcibly operates the brake driver 7 to assist the collision avoidance operation performed by the driver.

In this manner, the vehicle driving support device 1 according to the present embodiment detects the oncoming vehicle V on the opposite lane including more than one lane, and disposes the warning/AEB control for the oncoming vehicle V that is likely to collide with the vehicle M.

For example, in a case where the opposite lane includes two lanes, if the vehicle driving support device 1 operates the AEB control for the oncoming motorcycle V1 traveling on the first lane, the vehicle M may stop on the second lane at the collision avoidance point Pa.

At this time, the vehicle M is in a situation in which the vehicle M blocks the traveling path of the oncoming automobile V2 traveling on the second lane. Therefore, there is a possibility that the oncoming automobile V2 collides with a side surface of the vehicle M.

In a case where the AEB control is operated for the oncoming vehicle V traveling on the opposite lane, the vehicle driving support device 1 can perform control such that the vehicle M does not enter the intersection, regardless of the lane.

However, if such control is performed, a collision damage mitigation brake (AEB) is operated at a position against the intention of the driver who performs an operation to turn right at the intersection in accordance with the position of the oncoming vehicle V. Therefore, if the collision damage mitigation brake (AEB) is operated against the intention, there is a possibility that the driver becomes upset and makes an error in the driving operation, and there is a possibility that the vehicle M stalls at the intersection.

In contrast, the vehicle driving support device 1 according to the present embodiment can perform a reasonable collision damage mitigation brake (AEB) operation for each of the oncoming vehicles V traveling on the lanes of the opposite lane herein.

For example, before the vehicle M enters the intersection, the vehicle driving support device 1 determines the possibility of the collision with the oncoming vehicle V (the oncoming motorcycle V1) on the first lane of the opposite lane.

If it is determined that the collision damage mitigation brake (AEB) is to be operated for the oncoming vehicle V on the first lane, the vehicle driving support device 1 sets the collision forecast point P1 at which the forecast traveling path of the vehicle M and the traveling path of the oncoming vehicle V on the first lane intersect with each other.

At this time, the vehicle driving support device 1 temporarily determines control for operating the collision damage mitigation brake (AEB) for the collision forecast point P1. Note that the vehicle driving support device 1 disposes the warning/AEB control for stopping the vehicle M at the collision avoidance point Pa in front of the collision forecast point P1, and at the collision avoidance point Pa, the vehicle M avoids the collision with the oncoming vehicle V on the first lane.

Before the vehicle M enters the intersection, the vehicle driving support device 1 determines the possibility of the collision with the oncoming vehicle V (the oncoming automobile V2) on the second lane of the opposite lane.

If it is determined that the collision damage mitigation brake (AEB) is to be operated for the oncoming vehicle V on the second lane, the vehicle driving support device 1 sets the collision forecast point P2 at which the forecast traveling path of the vehicle M and the traveling path of the oncoming vehicle V on the second lane intersect with each other.

At this time, the vehicle driving support device 1 makes a change to perform control for operating the collision damage mitigation brake (AEB) for the collision forecast point P2. Note that the vehicle driving support device 1 disposes the warning/AEB control for stopping the vehicle M at the collision avoidance point Pb in front of the collision forecast point P2, and at the collision avoidance point Pb, the vehicle M avoids the collision with the oncoming vehicle V on the second lane.

In this manner, in the vehicle driving support device 1, the collision avoidance controller 20 provided in the travel control unit 10 causes the AEB operation determiner 24 to perform the following processing. The AEB operation determiner 24 disposes the collision avoidance control at the collision avoidance point Pb on the forecast traveling path of the vehicle M corresponding to the collision forecast point P2 on the second lane, which is the closer to the vehicle M, of the collision forecast points P1 and P2 for executing the warning/AEB control.

Furthermore, in a case where there is no possibility of the collision with the oncoming vehicle V (the oncoming automobile V2) on the second lane, the vehicle driving support device 1 disposes the AEB control. The AEB control is performed such that the predetermined vehicle speed, at which the vehicle M does not stop, remains at the collision avoidance point Pa in front of the collision forecast point P1, and at the collision avoidance point Pa, the collision with the oncoming vehicle V (the oncoming motorcycle V1) on the first lane is avoided. Thus, the vehicle M can be easily re-accelerated compared to starting from a stop, and it is possible to avoid a side collision of the oncoming vehicle V (the oncoming automobile V2) on the second lane with the vehicle M.

That is, since the kinetic energy remains, a re-acceleration response of the vehicle M after the oncoming vehicle V on the first lane passes through the collision forecast point P1 is improved. Therefore, the vehicle M can pass through the intersection more quickly, and it is possible to reduce the risk of the collision with the oncoming vehicle V in the second lane.

That is, for example, in a case where the oncoming vehicle V in the second lane is approaching the vehicle M while the vehicle M is turning (turning right) at the intersection, the vehicle driving support device 1 operates the collision damage mitigation brake (AEB) such that the vehicle speed, at which the vehicle M does not stop at the intersection, is achieved. Thus, the time taken for the vehicle M to restart is shortened, and the risk of an accident with the oncoming vehicle V in the second lane is reduced.

The above vehicle driving support device 1 disposes the warning/AEB control in a case where the opposite lane includes two lanes as an example. However, the present disclosure is not limited to this case, and can also be applied to disposing the warning/AEB control for stopping the vehicle M at the collision avoidance point according to the number of lanes of the opposite lanes.

As described above, the vehicle driving support device 1 according to the present embodiment can perform a reasonable operation of the collision damage mitigation brake (AEB) for avoiding the collision of the vehicle M with the oncoming vehicle V when the vehicle M turns across the opposite lane at the intersection (here, a left-hand traffic area is illustrated, and the vehicle M turns right at the intersection). For example, the operation is performed in a case where the opposite lane includes more than one lane.

Note that the travel control unit (ECU) 10 and the collision avoidance controller 20 include a processor including a central processing unit (CPU), storage devices such as a ROM and a RAM, and the like. All or some of the circuits of the processor may be implemented by software. For example, the CPU may read and execute various programs corresponding to the functions stored in the ROM.

Furthermore, all or some of the functions of the processor may be implemented by a logic circuit or an analog circuit, and the processing of various programs may be implemented by an electronic circuit such as a field-programmable gate array (FPGA).

The disclosure in the above embodiment is not limited to the above examples, and various modifications can be made without departing from the scope thereof in an execution stage. Furthermore, the above examples include disclosures in various stages, and various disclosures can be extracted by an appropriate combination of the disclosed constituent elements.

For example, even if some of the constituent elements are removed from all the constituent elements described in the examples, as long as the described problem can be solved and the described effects are produced, the configuration from which the constituent elements are removed can be extracted as a disclosure.

According to the present disclosure, it is possible to provide a vehicle driving support device that reduces a risk of an accident with another vehicle by reasonable collision damage mitigation brake control when a vehicle turns across an opposite lane at an intersection or the like.

The vehicle driving support device 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the surrounding environment recognition unit 2, the travel control unit 10, the vehicle position estimator 21, the oncoming vehicle recognizer 22, the collision forecast calculator 23, and the AEB operation determiner 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle driving support device comprising:

a surrounding environment recognition unit configured to acquire surrounding environment information of a surrounding environment ahead of a vehicle;

a travel control unit configured to operate a brake driver of the vehicle; and a collision avoidance controller provided in the travel control unit, wherein the collision avoidance controller comprises:

a vehicle position estimator configured to estimate a position of the vehicle and generate a forecast traveling path of the vehicle when the vehicle turns across an opposite lane at an intersection;

an oncoming vehicle recognizer configured to recognize an oncoming vehicle traveling on each of lanes of the opposite lane, based on the surrounding environment information;

a collision forecast calculator configured to detect, for each of the lanes, a collision forecast position at which the forecast traveling path of the vehicle intersects with a traveling path of the oncoming vehicle, and forecast a collision of the vehicle with the oncoming vehicle; and a collision avoidance operation determiner configured to determine whether to execute collision avoidance control in which the travel control unit operates the brake driver, for the collision forecast position at which the collision of the vehicle with the oncoming vehicle is forecast by the collision forecast calculator, and the collision avoidance controller is configured to perform the collision avoidance control such that kinetic energy remains in the vehicle in a traveling direction at a collision avoidance position on the forecast traveling path of the vehicle, the collision avoidance position corresponding to the collision forecast position for which the collision avoidance control is to be executed by the collision avoidance operation determiner, and the collision avoidance controller is further configured to perform the collision avoidance control such that a predetermined vehicle speed, which is set in advance and at which the vehicle does not stop, is achieved at the collision avoidance position.

2. The vehicle driving support device according to claim 1, wherein the collision avoidance controller is configured to, when, based on the surrounding environment information, the vehicle has not passed through a first collision forecast position and the vehicle has passed through a second collision forecast position, execute the collision avoidance control for forcibly stopping the vehicle in front of the first collision forecast position, the first collision forecast position being a position at which a collision with a first oncoming vehicle traveling on, of the opposite lane, a first lane farthest from the vehicle is forecast, the second collision forecast position being a position at which a collision with a second oncoming vehicle traveling on, of the opposite lane, a second lane closer to the vehicle than the first lane is forecast.

3. The vehicle driving support device according to claim 2, wherein the collision avoidance controller is configured to, when the vehicle has not passed through the second collision forecast position, execute the collision avoidance control for forcibly stopping the vehicle in front of the second collision forecast position.

4. A vehicle driving support device comprising:

circuitry configured to:

acquire surrounding environment information of a surrounding environment ahead of a vehicle;

operate a brake driver of the vehicle;

estimate a position of the vehicle and generate a forecast traveling path of the vehicle when the vehicle turns across an opposite lane at an intersection;

recognize an oncoming vehicle traveling on each of lanes of the opposite lane, based on the surrounding environment information;

detect, for each of the lanes, a collision forecast position at which the forecast traveling path of the vehicle intersects with a traveling path of the oncoming vehicle, and forecast a collision of the vehicle with the oncoming vehicle;

determine whether to execute collision avoidance control in which the brake driver is operated, for the collision forecast position at which the collision of the vehicle with the oncoming vehicle is forecast;

perform the collision avoidance control such that kinetic energy remains in the vehicle in a traveling direction at a collision avoidance position on the forecast traveling path of the vehicle, the collision avoidance position corresponding to the collision forecast position for which the collision avoidance control is to be executed; and perform the collision avoidance control such that a predetermined vehicle speed, which is set in advance and at which the vehicle does not stop, is achieved at the collision avoidance position.

5. The vehicle driving support device according to claim 1, wherein the collision forecast calculator is configured to detect (1) a first collision forecast position at which the forecast traveling path of the vehicle intersects with a traveling path of a first oncoming vehicle traveling on, of the opposite lane, a first lane farthest from the vehicle, and (2) a second collision forecast position at which the forecast traveling path of the vehicle intersects with a traveling path of a second oncoming vehicle traveling on, of the opposite lane, a second lane closer to the vehicle than the first lane, and the collision avoidance operation determiner is configured to dispose the collision avoidance position corresponding to the second collision forecast position on the forecast traveling path of the vehicle when both the first and second collision forecast positions are detected.

6. The vehicle driving support device according to claim 1, wherein the predetermined vehicle speed is set in advance to be greater than 0 km/h and less than 10 km/h.

7. The vehicle driving support device according to claim 1, wherein when a collision with an oncoming vehicle traveling on, of the opposite lane, a first lane farthest from the vehicle is forecast and a collision with an oncoming vehicle traveling on, of the opposite lane, a second lane closer to the vehicle than the first lane is not forecast, the collision avoidance controller is configured to perform the collision avoidance control such that the predetermined vehicle speed, at which the vehicle does not stop, remains at a first collision avoidance position corresponding to a first collision forecast position at which the collision with the oncoming vehicle on the first lane is forecast.

8. The vehicle driving support device according to claim 1, wherein the collision forecast calculator is configured to calculate, for each collision forecast position, a difference between an arrival time of the vehicle at the collision forecast position and an arrival time of the oncoming vehicle at the collision forecast position, and to compare an absolute value of the difference with a predetermined collision determination period, and the collision avoidance controller is configured to determine that the collision of the vehicle with the oncoming vehicle is to be forecast for the collision forecast position when the absolute value of the difference is less than or equal to the predetermined collision determination period, and the predetermined collision determination period is set in advance by adding a reaction period of a driver of the oncoming vehicle and a value obtained by dividing a vehicle speed of the oncoming vehicle by a predetermined deceleration expected to be performed by the driver.

9. The vehicle driving support device according to claim 1, wherein the oncoming vehicle recognizer is configured to detect, based on the surrounding environment information, a vehicle that changes lanes to a front of an oncoming vehicle traveling on one of the lanes of the opposite lane, and the collision forecast calculator is configured to set the vehicle that changes lanes as the oncoming vehicle traveling on the lane after the lane change when the vehicle changes lanes to the front of the oncoming vehicle.

* * * * *